United States Patent [19]

Pollano et al.

[11] Patent Number: 5,681,999
[45] Date of Patent: Oct. 28, 1997

[54] METHOD AND APPARATUS FOR MEASURING DRY PARTICLES

[76] Inventors: Humberto Eduardo Pollano; Omar Eduardo Contti, both of Colon 425, Bo. Las Flores, Rio Tercero, Córdoba, Argentina

[21] Appl. No.: 385,098

[22] Filed: Feb. 7, 1995

[30] Foreign Application Priority Data

Mar. 1, 1994 [AR] Argentina ................................. 327550

[51] Int. Cl.[6] ..................................................... G01F 1/30
[52] U.S. Cl. ................................. 73/861.73; 73/861.75
[58] Field of Search .......................... 73/861.73, 861.79, 73/505, 861.74, 861.75, 861.77, 861.81, 861.83

[56] References Cited

U.S. PATENT DOCUMENTS

| | | | |
|---|---|---|---|
| 3,611,803 | 10/1971 | Kajiura et al. | 73/861.73 |
| 3,640,136 | 2/1972 | Nolte | 73/861.73 |
| 4,122,715 | 10/1978 | Yokoyama et al. | 73/861.73 |
| 4,726,227 | 2/1988 | Moffatt et al. | 73/505 |
| 4,880,142 | 11/1989 | Higuchi et al. | 222/56 |
| 5,252,824 | 10/1993 | Picanyol | 73/861.77 |

*Primary Examiner*—George M. Dombroske
*Assistant Examiner*—Max H. Noori
*Attorney, Agent, or Firm*—Bachman & LaPointe, PC

[57] ABSTRACT

A method and apparatus for the continuous determination of the flow rate and/or total weight of dry particles, measuring the speed imposed to a movable member by dry particles falling thereon.

8 Claims, 2 Drawing Sheets

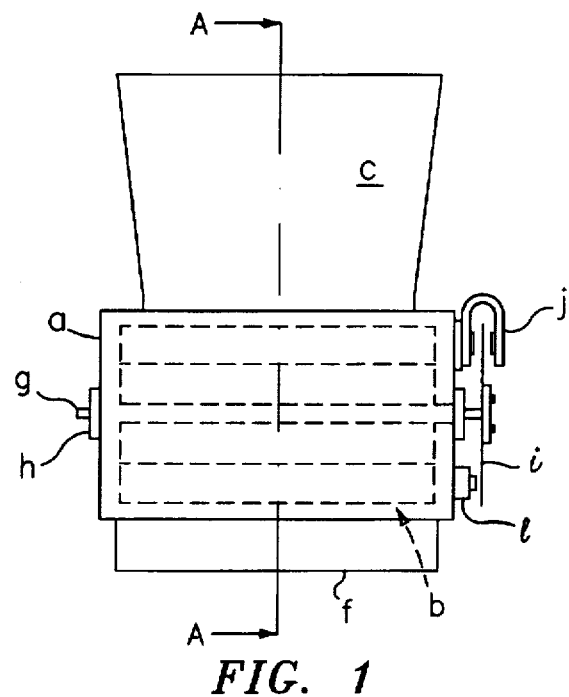
FIG. 1
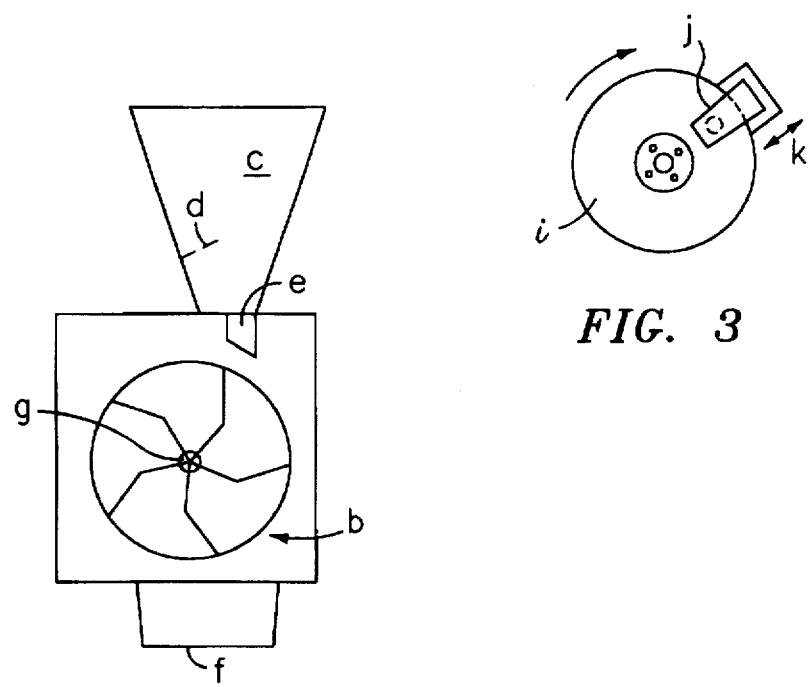
FIG. 2
FIG. 3

METHOD AND APPARATUS FOR MEASURING DRY PARTICLES

FIELD OF THE INVENTION

The instant invention relates to a. method for determining the weight flow rate of dry particles while falling, almost without interruption, from ahigh location, and its further addition in order to obtain the final weight. Besides, one of the operating embodiments is disclosed through which measurement of parameters not easily attained through other methods is obtained.

BACKGROUND OF THE INVENTION

The method and steps thereof are based on a practical and economical need in those places lacking platform scales (since they are fixed and expensive) or, where continuous measurement of the weight flow rate of dry particles is required, without accumulating the material into bins or hoppers.

The apparatus is specially adapted for weighing grain such as wheat, soy, corn, etc, thus solving a concern of agricultural producers since by means of the use of the present method and apparatus, which allows the "in situ" weighing of the produced grain at a very low cost without requiring expensive storage facilities.

The advantages of the invention are:

Ease of transportation and assembly. Low weight.

Low cost

Accumulation of dry particles is not required, therefore dimensions are not dependent on the total amount to be weighted.

Operation: Classic physics explains the operation. The second Newton Law applied to rotating bodies states that: "The Sum of Torques on an axis is equal to the product between the inertia momentum of the rotating body and its angular acceleration". Therefore, whenever a torque exists applied to a rotating body, the latter rotates with variable angular speed, proportional to said torque. In other words, if the resulting momentum is zero, the angular acceleration is also zero, and the movable body maintains constant its angular speed.

The measuring method and apparatus of the invention is based on the above principle. On one side, the driving torque caused by the dry particles falling on the vanes of the rotating wheel exists. If an antagonist torque directly proportional to the angular speed of the wheel is applied, a speed develops such that both torques are equal and, since are of different sign, the resulting force is null; therefore, at this point, the angular speed is constant as explained above. (Further, it is to be noted that in any practical system, there is a third torque, that caused by friction. This fact is taken into account by the electronic calculation system in order to compensate its influence).

Since the rotating speed of the wheel is a function of the driving torque, and this, in turn, depends on the instantaneous weight flow rate of the dry particles falling on the vanes, by measuring the instantaneous angular speed, the value of the weight flow rate of dry particles passing through the wheel at that moment may be obtained.

The antagonist momentum proportional to the angular speed is attained by means of an eddy current electromagnetic brake.

The subsystem for angular speed measuring, calculation and totalization the weight flow rate and display of results is comprised by a circuit the main element of which is a high scale integration electronic microcomputer.

The physical-mathematical development supporting the above follows:

Applying the second Newton Law to rotations $\Sigma C_i = I \times \alpha$ wherein Ci represents the different actuating torques; I the inertia momentum of the movable element and $\alpha$ the angular speed. $C_m$ being the driving torque caused by the grain falling; $C_r$ that produced by friction on bearings, and $C_f$ the braking torque produced by eddy currents, in this particular case, $$C_m - C_r - C_f = I \times \alpha$$

If $\omega$ is the angular speed, thus $$\omega = cte. \rightarrow \alpha = \frac{d\omega}{dt} = 0.$$

then, $$C_m - C_r = C_f$$

Therefore, since the antagonist torque provided by the eddy current brake is $C_f = K_f \times K_f$ being the proportionality constant depending on the element dimensions and magnetic induction of its magnets; the friction torque may be considered independent from the rotating speed for these rates; and due to the vane turbine and wheel theory, it may be considered with sufficient approximation, that $$C_m = \frac{Q_p}{g} \cdot (N_{te} - N_{ts}) \cdot \Gamma$$

wherein $Q_p$ is the dry particles weight flow rate, g is the gravity acceleration, $N_{te}$ is the inlet tangent speed, $N_{ts}$ the outlet tangent speed and $\Gamma$ is the wheel effective radius; therefore $$\frac{Q_p}{g} \cdot (N_{te} - N_{ts}) \cdot \Gamma - Cr = kf \cdot \omega$$

through mathematical calculation, and taking into account that $$\frac{Q_p}{g} \cdot N_{te} \cdot \Gamma - \frac{Q_p}{g} \cdot \omega \cdot \Gamma^2 - k_f \cdot \omega - Cr = 0$$

$$\omega = \frac{\frac{Q_p}{g} \cdot N_{te} \cdot \Gamma - Cr}{\frac{Q_p}{g} \cdot \Gamma^2 + k_f}$$

it is concluded that $\omega = f(Q_p)$

Therefore, measuring the instantaneous angular speed of the wheel (this measure being obtained readily), the value corresponding to the weight flow rate of dry particles falling at that moment may be computed, with the aid of a computer and, by means of a simple integration, the total weight of dry particles passing through the vane wheel may be also calculated.

Since the braking constant Ks depends, among other parameters, on the resistivity of the disk material used in its construction, this, in turn, varies as a function of the temperature (room temperature as well as the temperature created by operation), according to the precision level desired, a temperature electronic measuring system and its automatic compensation in calculations carried out by the micro-controller is included.

The device described is one of the embodiments in which this process may be used, as shown in the attached drawings, as a non-limiting example.

The apparatus or equipment comprises four basic subsystems:
1. Dry particles channelizing sub-system
2. Vane wheel rotating under dry particles falling influence.
3. Braking system proportional to the angular speed attained by the vane wheel.
4. Electronic system for reading parameters, calculation and display of the result.

BRIEF DESCRIPTION OF THE DRAWINGS

FIG. 1 is a front view of the measurement equipment, showing its simple and robust construction.

FIG. 2 is a section of the device taken along line A—A of FIG. 1.

FIG. 3 is a schematic view of one of the embodiments of the eddy current brake, which has been used due to its ready construction and adjustment.

Figure 4:
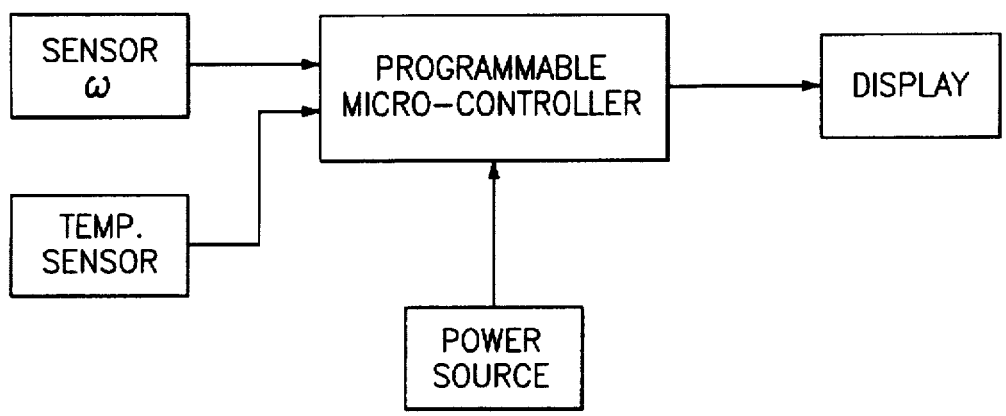
FIG. 4 is a block diagram of the electronic system, with completely standard components and easily available in the market.

In the drawings, the same reference letters correspond to the same constituting elements.

DETAILED DESCRIPTION OF THE INVENTION

As may be seen in FIG. 1, the equipment is constituted by a housing —a— containing the vane wheel —b—, such wheel rotating under the power provided by dry particles falling, the dry particles being channelized thereto through bin —c—, the spreader —d— and a "levelling" hole "e". Once on the vane, dry particles transfer power to the apparatus and fall freely through the outlet bore "f". At one end of the single shaft "g", fixed to the housing by tight ball bearings —h— there is a copper disk —i—, rotating solidary to said shaft, and is crossed at the edge by the magnetic field provided by permanent magnet —j— used for causing the antagonist torque proportional to rotation, due to the interaction between currents induced in the disk and the inductor magnetic field, called "eddy current brake", shown in a greater detail in FIG. 3, wherein the movement calibrating the radial distance of magnets (indicated by double arrow —k—) may be seen, which allows initial adjustment of the braking constant value.

Figure 5:
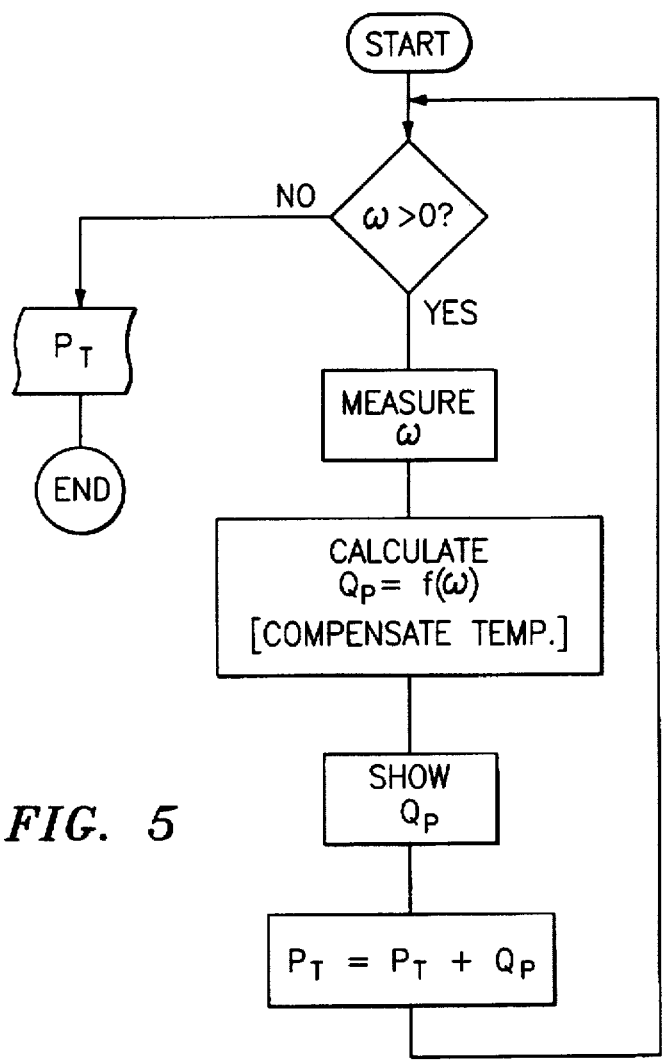
FIG. 5 is a software flow diagram to be recorded in the "micro-controller chip", which controls all operations of the device.

The disk is also used for providing the angular speed signal, taken by an optical or magnetic sensor —l— acting as generator of angular steps, such signal being sent to the electronic microcomputer which processes the signal for obtaining the flow rate value, final weight value, or both (after temperature compensation, if required), and showing the results on a digital display. FIG. 4 shows the block diagram of this part of the apparatus and FIG. 5 shows the flow diagram corresponding to the software to be followed by the micro-controller (which is recorded at its non-volatile memory), once the apparatus is started up.

The function allowing the dry particle weight flow rate is obtained through practical tests, this providing a proper adaptation to mechanical and electronic tolerances, inherent of any actual system.

We claim:

1. An apparatus for measuring at least one of weight flow rate and total weight of dry particles, comprising:

means for channeling dry particles on a substantially vertical flow;

a rotating member mounted for rotation around a substantially horizontal axis and positioned relative to said means for channeling so that said substantially vertical flow causes rotation of said rotating member around said axis in one direction;

means for applying a braking force to said rotating member against rotation in said one direction; and means for correlating speed of rotation of said rotating member and said braking force to determine said at least one of weight flow rate and total weight of said dry particles.

2. A method for measuring at least one of weight flow rate and total weight of dry particles, comprising the steps of:

providing said dry particles in a substantially vertical flow;

positioning a rotatable member in said substantially vertical flow and mounted for rotation around a substantially horizontal axis so as to cause rotation of said rotatable member in one direction;

applying a braking force to said rotating member against said rotation in said one direction; and determining said at least one of weight flow rate and total weight of said dry particles from speed of rotation of said rotating member and said braking force.

3. The method according to claim 2, wherein the step of applying said braking force comprises applying a force proportional to said speed of rotation.

4. The apparatus according to claim 1, wherein said rotating member comprises a vane wheel having a plurality of radially extending vanes.

5. The apparatus according to claim 1, wherein said rotating member is positioned such that said substantially vertical flow impacts said rotating member substantially entirely spaced laterally to one side of said axis.

6. The apparatus according to claim 1, wherein said means for braking comprises an eddy current brake for applying said braking force to said rotating member which is directly proportional to said speed of rotation of said rotating member.

7. The apparatus according to claim 6, wherein said eddy current brake comprises a disk member mounted for rotation with said rotating member, and means for generating a magnetic field to said disk member to apply said braking force.

8. The apparatus according to claim 7, wherein said means for correlating includes a sensor for determining speed of rotation of said disk member.

* * * * *